United States Patent [19]

Chen

[11] 3,997,690
[45] Dec. 14, 1976

[54] METHOD OF ADJUSTING REFRACTIVE INDEX OF PLZT OPTICAL COATING ON OPTICAL ELEMENT

[75] Inventor: Di Chen, Minnetonka, Minn.

[73] Assignee: Honeywell Inc., Minneapolis, Minn.

[22] Filed: May 27, 1975

[21] Appl. No.: 581,302

[52] U.S. Cl. .............................. 427/162; 106/73.3; 204/192; 252/62.9; 350/150; 350/160 R; 423/263; 423/598; 427/164; 427/165; 427/166; 427/372 R; 427/377; 427/380

[51] Int. Cl.² .................... B05D 5/06; C04B 35/46; C23C 15/00

[58] Field of Search ......... 350/96 WG, 150, 160 R; 106/73.3; 204/192 M, 192 OP; 252/62.9 PZ; 423/263, 598; 427/162, 108, 164–166, 377, 380, 372

[56] References Cited

UNITED STATES PATENTS

| | | | |
|---|---|---|---|
| 3,666,666 | 5/1972 | Haertling | 252/62.9 PZ |
| 3,718,723 | 2/1973 | Fraser et al. | 252/62.9 PZ |
| 3,804,765 | 4/1974 | Buckner et al. | 252/62.9 PZ |
| 3,871,745 | 3/1975 | Wahn et al. | 350/150 |
| 3,873,183 | 3/1975 | Lee et al. | 350/96 WG |
| 3,923,675 | 12/1975 | Mazdiyasni et al. | 106/73.3 |

OTHER PUBLICATIONS

Abstracts, Journal of the Optical Society of America, vol. 65(2), pp. 225–226, Feb. 1975.

*Primary Examiner*—William H. Schmidt
*Attorney, Agent, or Firm*—Omund R. Dahle; David R. Fairbairn

[57] ABSTRACT

Method for adjusting index of refraction of optical coating by heat treating. PLZT ceramic can be sputtered to form a thin film optical coating material for various optical applications. The fact that its refractive index can be adjusted by diffusion makes it particularly useful for antireflection coating or reflection coating on optical surfaces.

10 Claims, 2 Drawing Figures

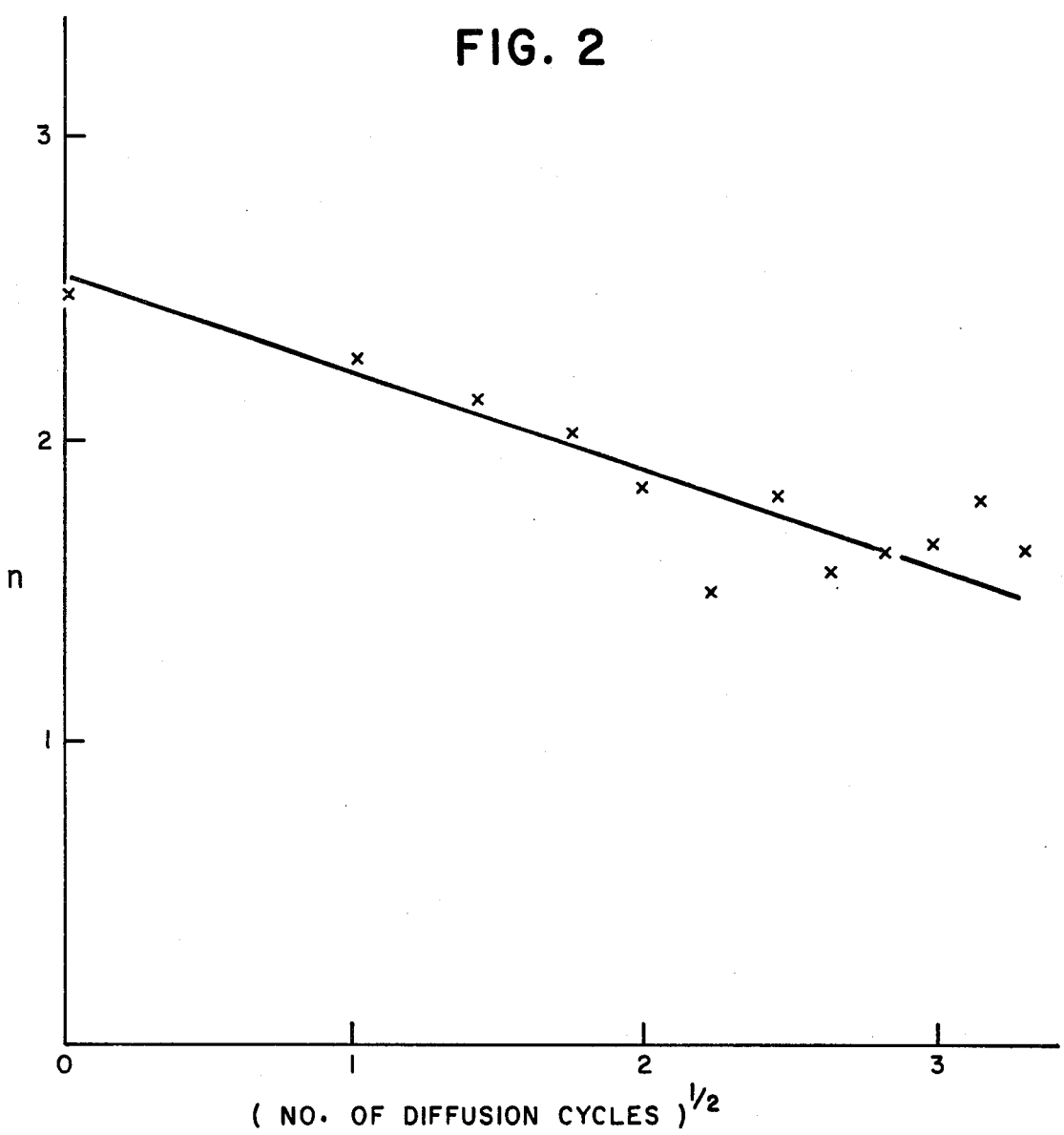

METHOD OF ADJUSTING REFRACTIVE INDEX OF PLZT OPTICAL COATING ON OPTICAL ELEMENT

BACKGROUND AND SUMMARY OF THE INVENTION

Hard optical coating materials usually have a fixed refractive index. In order to obtain optical coatings with suitable refractive index to match different requirements, the prior art process is to search for a coating material with proper refractive index to suit a need. I know of no technique whereby one coating material can be used with adjustable refractive index to suit all needs.

I have discovered that a PLZT optical coating, which is a hard optical coating, can have its refractive index adjusted by diffusion to match a required value thereby allowing the use of a single material with adjustable refractive index for many varied optical coating needs.

PLZT ceramics with a Zr/Ti ratio in the range around 65/35 and with La doping around 8 – 9% have been heated in a controlled atmosphere up to 800° C. The surface refractive index was measured and found to decrease monotonically from about 2.5 down to about 1.5 to 6328A wavelength, as a function of the number of heating cycles or total time lapse at the peak temperature. This refractive index variation is due to out-diffusion of one or more of the elements in PLZT. This fact combined with the finding that durable films of high refractive indices (~2.5) can be prepared by sputtering, makes PLZT a suitable material for optical coating. The refractive index of the coating can be adjusted by heating the film in a controlled atmosphere, in one case a vacuum of about $10^{-4}$ Torr, for a suitable time duration. As referred to herein, by optical coatings is meant coatings having a thickness of from about a quarter wavelength up to about one wavelength ($\lambda$), i.e. in the range of about 0.1 to about 1 micron in thickness.

DESCRIPTION

Figure 1:
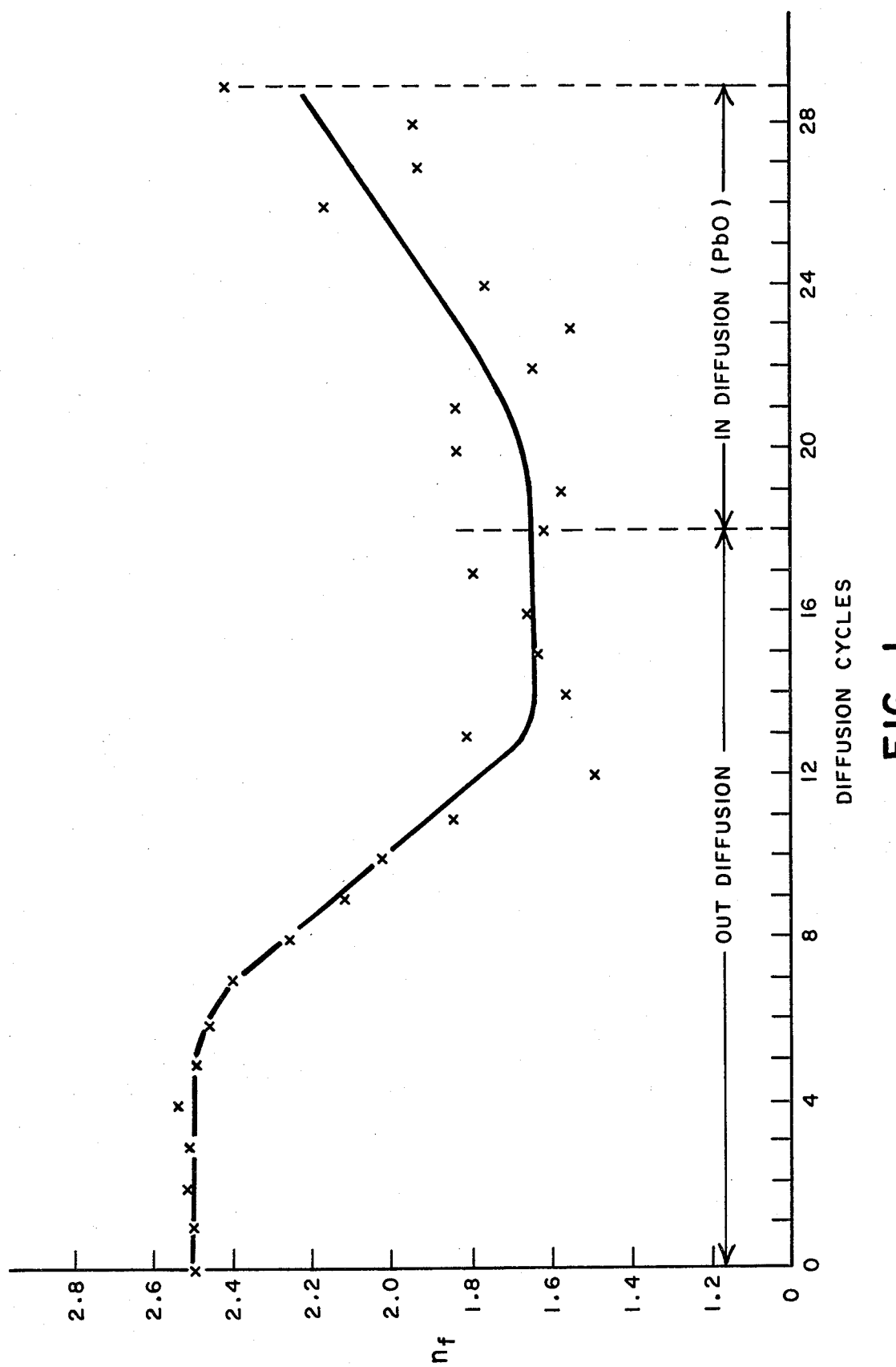
FIG. 1 is a graphical representation of the surface refractive index $n$ in experiments of out-diffusion and in-diffusion of PLZT and, FIG. 2 is a graphical representation of surface refractive index vs. square root of diffusion cycles.

To be described herein is a method for adjusting an index of refraction of a lanthanum modified lead-zirconate-titanate (PLZT) optical coating which has been deposited on an optical body, for example, a lens, the index of refraction of the coating being changed by heat treating the coated optical body in a controlled atmosphere. A specific composition of the PLZT has a Zr/Ti ration in the range around 65/35 and with lanthanum substitution in the range around 8 – 9%. The PLZT is preferably sputtered to form the film or coating on a surface of the optical body. The initial index of refraction of the PLZT coating is relatively high $\cong 2.5$. It has been determined that at a heat treating temperature of about 800° C the refractive index can be changed.

In this invention, the optical body being coated is of an optical material able to withstand a temperature excursion to 800° for a period of hours. One specific example of a suitable material is glass.

Electro-optic ceramic material of the quaternary $(Pb_{1-x}La_x)(Zr_yTi_{1-y})O_3$ system commonly known as PLZT has been intensively investigated in recent years. The high optical transmission and high refractive index in the visible to near infrared region, large linear and quadratic electro-optic effect, and the availability of materials possessing a range of desirable properties make PLZT extremely useful for electro-optic applications. Epitaxial growth of PLZT monocrystalline thin film oxides is generally obtained by chemical vapor transport and liquid phase epitaxy methods. The refractive index of PLZT is strongly dependent on the La content and the Zr/Ti ratio. This makes the medium suitable for the in-diffusion or out-diffusion technique to achieve refractive index modification.

Modification of refractive index of PLZT is possible because PbO is a component in PLZT that can be readily out-diffused as well as in-diffused at a temperature of 800° C. First analyzing the case of out-diffusion, PLZT may be designated as $(PbO)_{1-x} \cdot La_x(Zr_yTi_{(1-y)})_{1-x/4} O_{2+x}$. If the concentration of PbO for a given PLZT sample is altered, the material after diffusion may be designated as $$2[(PbO)_{1-x}]_\nu [La_x(Zr_yTi_{(1-y)})_{1-x/4} O_{2+x}]_1 \nu$$

where $\nu$ is close to 0.5 during the experiment.

From this formulation, it can be expected that a small change of $d\nu$ is equivalent to a change of $-2dx$. From known results on the refractive index dependence on $x$ (La concentration), we have therefore $$\frac{dn}{dx} \cong -1 \qquad \text{Equation 1}$$

$$\frac{dn}{d\nu} \cong +\tfrac{1}{2} \qquad \text{Equation 2}$$

Following the analysis of J. R. Carruthers, I. P. Kaminov and L. W. Stulz, "Diffusion Kinetics and Optical Wave-guiding Properties of Out-diffused Layers in LiNbO$_3$ and LiTaO$_3$", Appl. Optics, 13, 2333 (1974), we may define the concentration of PbO, relating to variation of $\nu$ by $$C = -\Delta\nu (M_{PbO}/M_{PLZT}) \rho_{PLZT} = -\Delta\nu \times 0.567 \qquad \text{Equation 3}$$

where M's are the molecular weights and $\rho$ the density. Fick's second law of diffusion is defined by $$\frac{dC}{dt} = D[d^2C/dy^2] \quad 0<y<\infty \qquad \text{Equation 4}$$

where $y$ is the distance from surface and $t$ the time. The diffusion constant D is temperature T dependent as $$D = D_0 exp(-Q_D/RT) \qquad \text{Equation 5}$$

which defines the activation energy $Q_D$, with R = 1.99 cal/° K mol. The vaporization flux $J_\nu$ is given by $$J_\nu = D (dC/dy)_{y=0} \qquad \text{Equation 6}$$

The solution for C is $$C = 2J_\nu [t/D]^{1/2} ierfc[y/2 \sqrt{Dt}] \qquad \text{Equation 7}$$

where *ierfc* is the integral of the error function complement. Alternatively, experimental results indicate that a reasonable fit could be obtained using exponential dependence. At the surface, $$C(O,t) = 2J_\nu \ (t/d\pi)^{1/2} \qquad \text{Equation 8}$$

From equations 2, 3 we have $$\Delta n = \Delta \nu/2 = -0.88C \qquad \text{Equation 9}$$

At the surface $$\Delta n(O,t) = -1.77 J_\nu \ ](t/D\pi)^{1/2} \qquad \text{Equation 10}$$

The vaporization flux is related to the equilibrium vapor pressure $P_L$ in atm and temperature T in °K by the Langmuri relation, assuming the molecules evaporate into vacuum, $$J_\nu = 44.4 \ P_L/[T/M_{PbO}]^{1/2} \ \text{gm/cm}^2/\text{sec} \qquad \text{Equation 11}$$

At this point, we can assess the technique to evaluate the pertinent coefficients with a view of achieving an understanding of the diffusion process in PLZT. The measurable quantities are: (1) $\Delta n(O,t)$ by Brewster angle technique on sample surface, (2) $\Delta n(y,t)$ by interference microscope measurements and, (3) $J_\nu$ by direct measurement of weight loss. We obtain D by the $\Delta n(O,t)$ and $J_\nu$ measurements. Measuring $\Delta n(y,t)$ also yields $J_\nu$ and $D$.

In Table 1 are listed the physical properties, of the component materials, relevant to the diffusion process. This Table indicates that at a temperature at or below 800° C, only PbO will be affected.

Table 1.

| Material | Physical Properties of Component Materials of PLZT | | |
|---|---|---|---|
| | Melting Temp. °C | Density gm/cc | Vaporization Temperature at $10^{-4}$ Torr |
| PbO | 890 | 9.5 | 550 |
| La$_2$O$_3$ | 2215 | 6.5 | 2000 |
| TiO$_2$ | 1850 | 4.3 | 1000 |
| ZrO$_2$ | 2700 | 5.6 | 2200 |

It is believed, from the indicated properties, that at a temperature of 800° C or below, out-diffusion of any component except PbO is not appreciable. Based on this observation, in-diffusion has been performed also by placing PbO materials in the diffusion chamber. The observed recovery of the refractive index and weight increase under this condition further verifies that PbO is the active element involved in the diffusion process.

The weight loss due to out-diffusion on PLZT samples is a function of temperature. The diffusion time is calculated based on the time a peak temperature with a small addition to take into account the temperature rise and fall for each heating cycle. These results give the following data shown in Table 2.

Table 2.

| Sample Treated | Diffusion Temperature and Vaporization Flux | | |
|---|---|---|---|
| | Diffusion Temperature | $J_\nu$ gm/cm$^{-2}$/sec | $P_L$(atm) |
| PLZT | 800° C(Thin) | 41 × 10$^{-9}$ | 1.9 × 10$^{-9}$ |
| | 800° C(Thick) | 25.6 × 10$^{-9}$ | 1.2 × 10$^{-9}$ |

Table 2.-continued

| Sample Treated | Diffusion Temperature and Vaporization Flux | | |
|---|---|---|---|
| | Diffusion Temperature | $J_\nu$ gm/cm$^{-2}$/sec | $P_L$(atm) |
| | 750° C | 5 × 10$^{-9}$ | 0.23 × 10$^{-9}$ |
| | 700° C | 1.3 × 10$^{-9}$ | 0.059 × 10$^{-9}$ |
| PLZT + PbO | 800° (Thin) | −9.4 × 10$^{-9}$ | 0.45 × 10$^{-9}$ |

The refractive index *n* at the surface of out-diffused and subsequently in-diffused samples were measured after each diffusion cycle by the Brewster angle technique. The result from one sample is shown in FIG. 1. FIG. 1 shows surface refractive index $n_f$ changes versus cycles of out-diffusion and in-diffusion of PLZT. In the specific example shown by the curve of this Figure, each heating cycle consists of a 20 minute temperature rise time, 40 minutes at 800° C, and 5 minutes of temperature fall time, except the first seven cycles where only rapid heating and cooling were used for sample normalization. The original sample weight is 7 gm with a surface area of 5.7cm$^2$. The vacuum at the vacuum pump is 3–8 × 10$^{-6}$ mmHg.

To evaluate that $t^{1/2}$ dependence of *n* at the surface of the sample, the results are replotted as shown in FIG. 2. FIG. 2 plots the surface refractive index versus square root of diffusion cycles. This gives $\Delta n/t^{1/2}$ which is related to $J_\nu$ by $$\frac{\Delta n}{t^{1/2}} = -1.77 J_\nu \left(\frac{1}{D\pi}\right)^{1/2} \qquad \text{Equation 12}$$

From these results we obtain $\Delta n/t^{1/2}$ to be 0.0061 sec$^{1/2}$. This combined with $J_\nu = 41 \times 10^{-9}$ yields $$D = 0.45 \times 10^{-10} \text{cm}^2/\text{sec}.$$

The refractive index gradient has been measured in a bulk thick sample using a Zeiss Jamin-Lebedeff transmission interference microscope. The out-diffused sample was first sliced perpendicular to the out-diffused surface and then polished to optical flat. Care was taken to avoid any turned down at the edge.

The interference pattern at the surface of the out-diffused sample was photographed with a 5460° A light source and the fringe lines of the photograph observed. The center of gravity of each fringe line was traced and the surface refractive index profile was then obtained. The diffusion depth extended to ≅ 0.1 millimeter. The thickness of the sample used was 114.3 μm. The refractive index variation at the surface was given from equations 2, 3, and 6 to yield $$J = D \cdot 1.13 \left(\frac{dn}{dy}\right) \qquad \text{Equation 13}$$

The measured value of $(dn/dy) = 7.7$ cm$^{-1}$. Therefore, for this particular sample with $J_\nu = 1.2 \times 10^{-9}$, we obtain $$D = 1.38 \times 10^{-10} \text{ cm}^2/\text{sec}$$

This checks well with the D value obtained earlier since they are measured for different samples.

For the optical coating applications, the coating thicknesses are approximately ¼ to a few wavelengths of the optical beam, and the refractive index of the coating is nearly uniform throughout the out-diffused layer.

In the above description I have described a method for adjusting the index of refraction of a PLZT coating which has been deposited on an optical body by heat treating the PLZT coating in a controlled atmosphere whereby a single coating material can be used yet providing an adjustable index to match a desired value.

The embodiments of the invention in which an exclusive property or right is claimed are defined as follows:

1. A method of adjusting the index of refraction of a lanthanum modified lead-zirconate-titanate (PLZT) optical coating which has been deposited on an optical body comprising the steps of:
    a. providing a controlled atmosphere for the coated optical body;
    b. heat treating the coated optical body in the controlled atmosphere to thereby adjust the index of refraction of the optical coating for modified reflectance or transmittance.

2. The method according to claim 1 wherein the controlled atmosphere is a vacuum of about $10^{-4}$ to $10^{-6}$ Torr.

3. The method according to claim 1 wherein the step of heat treating is at a temperature of about 800° C.

4. The method according to claim 1 wherein the PLZT coating material has a Zr/Ti ratio in the range around 65/35 and with lanthanum substitution in the range around 8 to 9%.

5. The method according to claim 1 wherein the controlled atmosphere is a PbO vapor.

6. A method of preparing an optical coating of a desired refractive index on an optical body comprising the steps of:
    a. depositing an optical coating of lanthanum modified lead-zirconate-titanate on an optical body, the coating having an initial index of refraction which may differ from a desired index; and
    b. heat treating the deposited coating in a controlled atmosphere to adjust the index of refraction thereof to the desired index.

7. The method of claim 6 and further comprising the additional preliminary step of: providing an optical coating composition of lanthanum modified lead-zirconate-titanate with a Zr/Ti ratio in the range around 65/35 and with lanthanum substitution in the range around 8 to 9%.

8. The method of claim 6 wherein the step of heat treating is at a temperature of about 800° C.

9. The method of claim 6 wherein the step of heat treating further comprises:
    a. increasing the temperature of the coating to about 800° C;
    b. holding the temperature at about 800° C for a predetermined time;
    c. reducing the temperature of the coating; and
    d. repeating steps a, b, and c as required to obtain the desired index.

10. The method of claim 9 wherein the predetermined time is sufficient to allow diffusion of a component of the PLZT.

* * * * *